(12) United States Patent
Strenzke et al.

(10) Patent No.: US 12,495,247 B2
(45) Date of Patent: Dec. 9, 2025

(54) AUTONOMOUS VEHICLE WITH MICROPHONE SAFETY

(71) Applicant: Motional AD LLC, Boston, MA (US)

(72) Inventors: Ruben Strenzke, Singapore (SG); Jugal Buddhadev, Boston, MA (US)

(73) Assignee: Motional AD LLC, Boston, MA (US)

( * ) Notice: Subject to any disclaimer, the term of this patent is extended or adjusted under 35 U.S.C. 154(b) by 182 days.

(21) Appl. No.: 18/146,536

(22) Filed: Dec. 27, 2022

(65) Prior Publication Data
US 2023/0209253 A1 Jun. 29, 2023

Related U.S. Application Data

(60) Provisional application No. 63/294,394, filed on Dec. 29, 2021.

(51) Int. Cl.
| | |
|---|---|
| *B60W 50/02* | (2012.01) |
| *B60W 60/00* | (2020.01) |
| *G10L 25/30* | (2013.01) |
| *H04R 1/40* | (2006.01) |

(52) U.S. Cl.
CPC ......... *H04R 1/406* (2013.01); *B60W 50/0205* (2013.01); *B60W 60/0015* (2020.02); *G10L 25/30* (2013.01); *B60W 2050/021* (2013.01); *B60W 2050/0215* (2013.01); *B60W 2420/54* (2013.01)

(58) Field of Classification Search
None
See application file for complete search history.

(56) References Cited

U.S. PATENT DOCUMENTS

| | | | |
|---|---|---|---|
| 7,103,460 B1 | 9/2006 | Breed | |
| 9,873,428 B2 | 1/2018 | Banvait et al. | |
| 2009/0296946 A1* | 12/2009 | Zhang | H04R 29/005 |
| | | | 381/58 |

(Continued)

FOREIGN PATENT DOCUMENTS

| | | | |
|---|---|---|---|
| CN | 112506690 A | 3/2021 | |
| DE | 102014226358 A1 * | 6/2016 | ............ B60S 1/0844 |

(Continued)

OTHER PUBLICATIONS

International Search Report and Written Opinion received for PCT Patent Application No. PCT/US2022/082391, mailed on Jun. 2, 2023.

(Continued)

*Primary Examiner* — James K Mooney
(74) *Attorney, Agent, or Firm* — Knobbe, Martens, Olson & Bear, LLP

(57) ABSTRACT

Provided are methods related to autonomous vehicle with microphone safety. The method can include obtaining, using a microphone array and at least one processor, a plurality of microphone input signals including a first microphone input signal and a second microphone input signal; determining, using the at least one processor, an impact on the microphone array based on the first microphone input signal and the second microphone input signal; and providing, via an interface and using the at least one processor, an instruction associated with the impact. Systems and computer program products are also provided.

19 Claims, 15 Drawing Sheets

(56) References Cited

U.S. PATENT DOCUMENTS

| | | | |
|---|---|---|---|
| 2017/0113684 A1* | 4/2017 | Banvait | G05D 1/0255 |
| 2019/0258737 A1 | 8/2019 | Wang et al. | |
| 2020/0031337 A1* | 1/2020 | Soltanian | G05D 1/0248 |
| 2021/0335064 A1 | 10/2021 | Kim et al. | |
| 2022/0126866 A1* | 4/2022 | Brown | B60W 60/0017 |
| 2022/0157165 A1* | 5/2022 | Dantrey | G06N 3/047 |
| 2022/0308973 A1* | 9/2022 | Decrop | G06F 11/0751 |

FOREIGN PATENT DOCUMENTS

| | | | |
|---|---|---|---|
| DE | 102019204209 A1 * | 10/2020 | |
| WO | WO 2021/030508 A1 | 2/2021 | |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
International Preliminary Report on Patentability received for PCT Patent Application No. PCT/US2022/082391, mailed on Jul. 11, 2024.

* cited by examiner ial Application No. 63/294,394, filed on Dec. 29,

AUTONOMOUS VEHICLE WITH MICROPHONE SAFETY

CROSS-REFERENCE TO RELATED APPLICATIONS

The present application claims priority/benefit from U.S. Provisional Application No. 63/294,394, filed on Dec. 29, 2021, entitled "AUTONOMOUS VEHICLE WITH MICROPHONE SAFETY" which is herein incorporated by reference in its entirety.

BACKGROUND

Autonomous vehicles (AVs) include various types of sensors including lidar, radar, cameras, infrared, microphones, and other sensors. However, not all sensor types qualify for a high, if any, functional safety rating and thus do not qualify for performing safety-critical functions.

DETAILED DESCRIPTION

Figure 1:
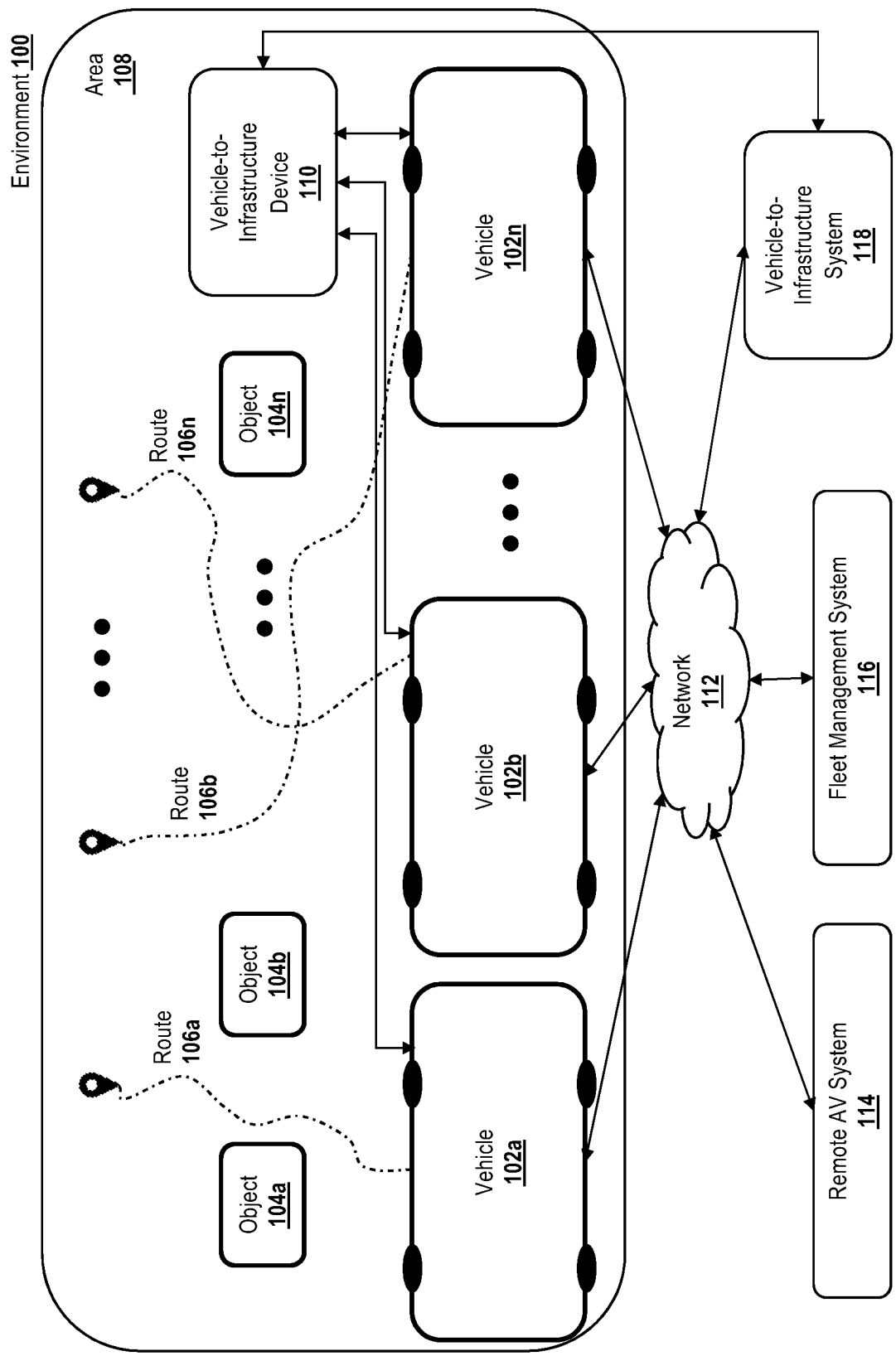
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element can not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as can be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This can refer to a direct or indirect connection that is wired and/or wireless in nature. Additionally, two units can be in communication with each other even though the information transmitted can be modified, processed, relayed, and/or routed between the first and second unit. For example, a first unit can be in communication with a second unit even though the first unit passively receives information and does not actively transmit information to the second unit. As another example, a first unit can be in communication with a second unit if at least one intermediary unit (e.g., a third unit located between the first unit and the second unit)

processes information received from the first unit and transmits the processed information to the second unit. In some embodiments, a message can refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

As used herein, "at least one," and "one or more" includes a function being performed by one element, a function being performed by more than one element, e.g., in a distributed fashion, several functions being performed by one element, several functions being performed by several elements, or any combination of the above.

Some embodiments of the present disclosure are described herein in connection with a threshold/criterion. As described herein, satisfying a threshold/criterion can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement methods and systems for monitoring a microphone array, e.g., of an autonomous vehicle, to provide functionality and techniques that allow microphones and microphone arrays to be used in autonomous driving or other applications, where functional safety of the microphone array can be of key importance.

By virtue of the implementation of systems, methods, and computer program products described herein, techniques for autonomous vehicle with microphone safety and related methods and systems are provided with improved AV awareness of the surrounding environment in turn allowing for improved control of the AV. Some of the advantages of these techniques include increasing the number of available sensor types or modalities in sensor suite available for AV's by improving the functional safety of a microphone array, in particular by monitoring and detecting malfunction of the microphones and/or deviations in the microphone input signals, e.g. caused by collisions or other impacts. By virtue of implementation of certain techniques described herein, AVs can benefit from an increased sensor modality and reliability thereby improving operational safety of the AV.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 can include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
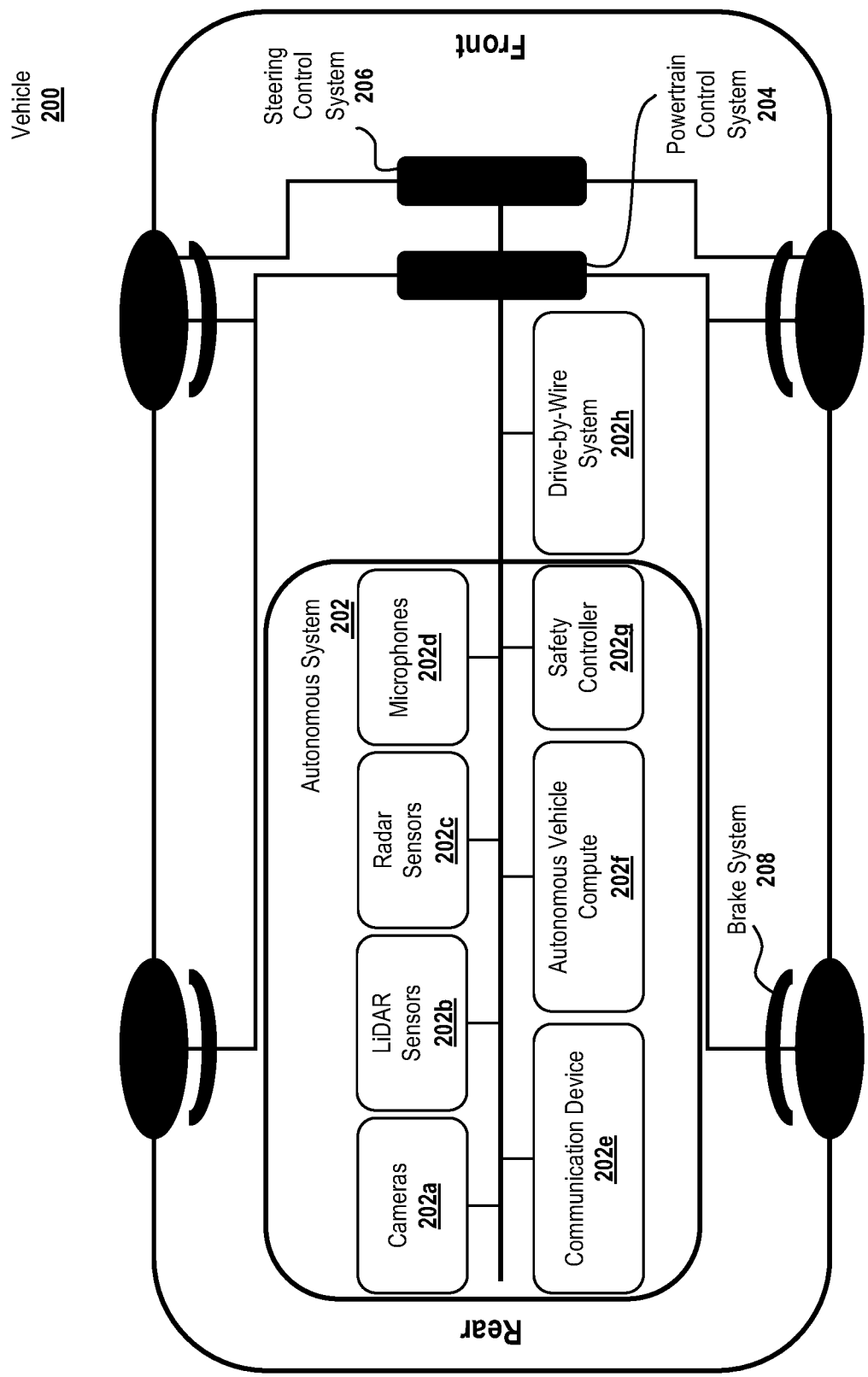
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference can be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and safety controller 202g.

Figure 3:
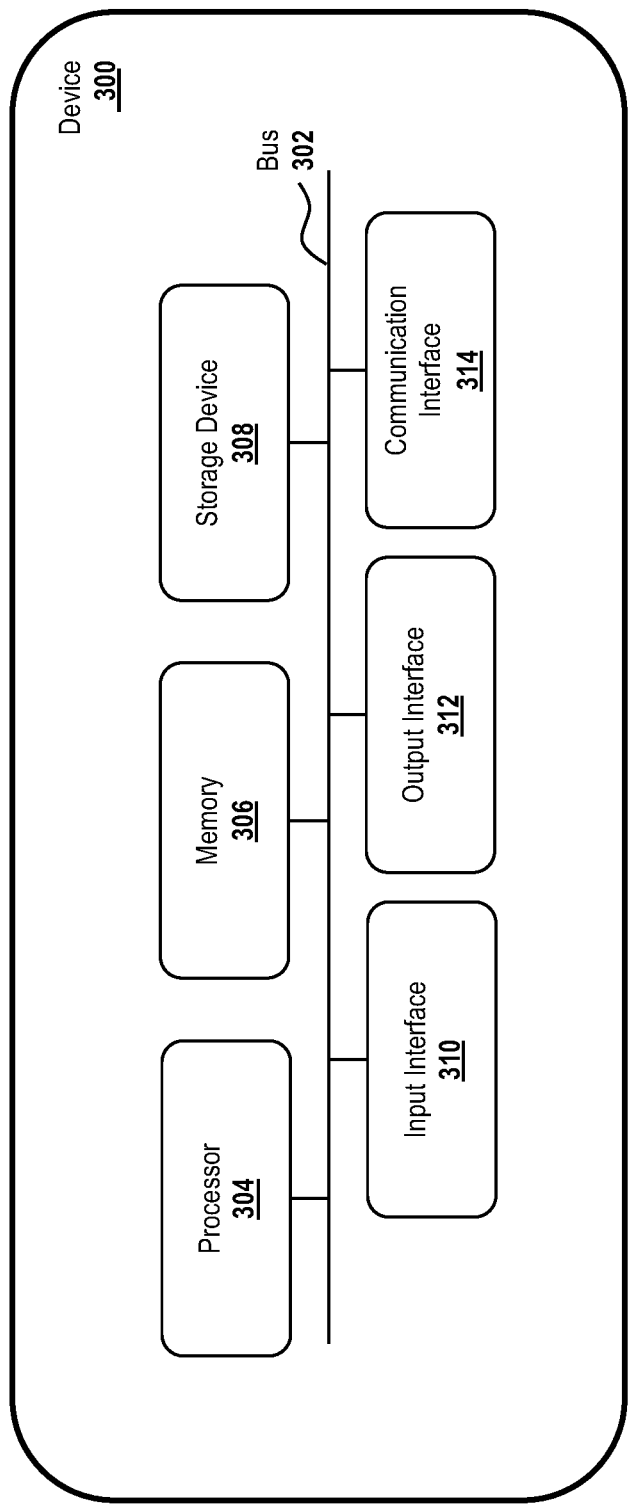
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data can specify at least one parameter (e.g., image characteristics such as exposure, brightness, etc., an image timestamp, and/or the like) corresponding to the image. In such an example, the image can be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data. In some examples, microphones 202d or at least some of microphones 202d form a microphone array comprising a plurality of microphones, such as at least three microphones.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e can include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor or sensors that senses information (e.g., a global positioning system (GPS) receiver, an accelerometer, a gyroscope, an actuator, a microphone array comprising a plurality of microphones, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
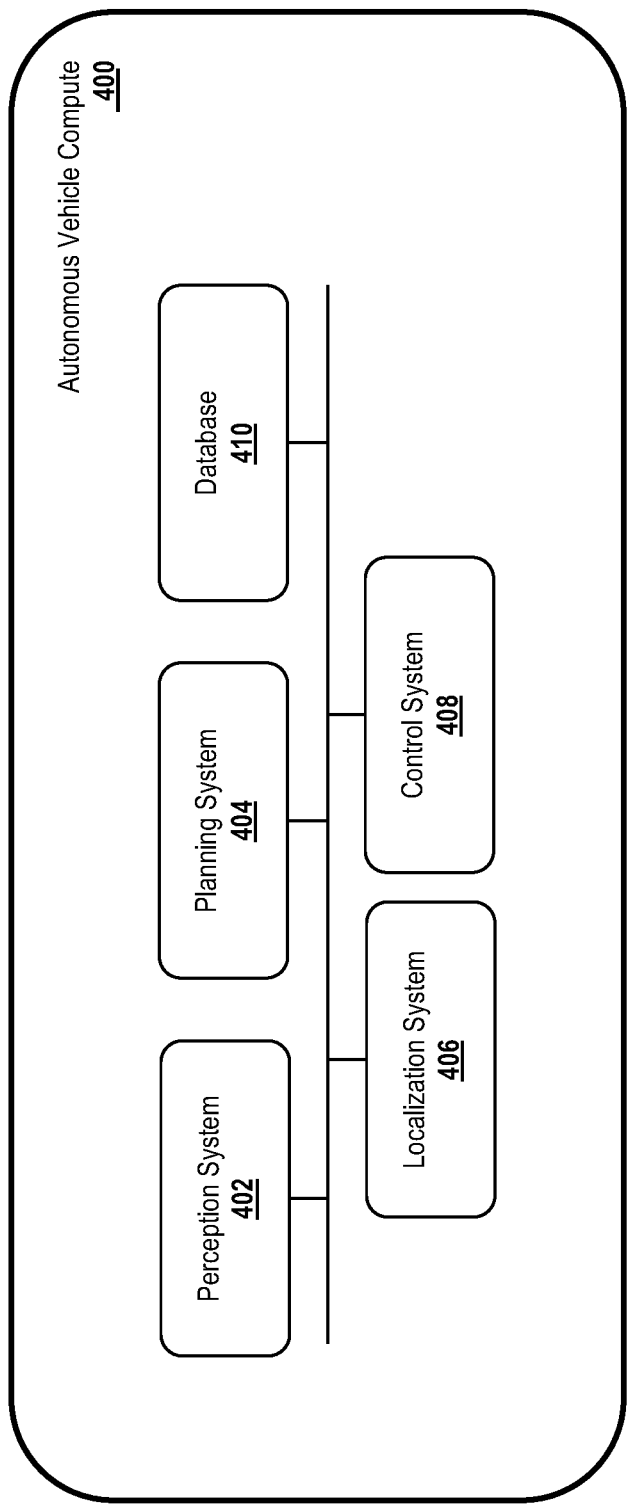
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some examples, perception system 402 receives audio data/microphone input signals captured or recorded by at least one microphone (e.g., microphones 202d), the audio data/microphone input signals associated with (e.g., representing) audio or audio sources within an audio range of the at least one microphone. In such an example, perception system 402 can classify at least one audio source based on one or more groupings of audio sources. In some embodiments, perception system 402 receives audio data/microphone input signals associated with at least one impact (e.g., data that is used by perception system 402 to detect the at least one impact) in an environment and classifies the at least one impact. In some embodiments, perception system 402 transmits data associated with the classification of the impact(s), such as an instruction associated with the impact to planning system 404 based on perception system 402 classifying the impact(s). In some examples, perception system 402 implements a monitor system, e.g. monitor system 504a as illustrated in FIGS. 5A-5F.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of audio, described above) and planning system 404 updates the at least one trajectory or generates at least one different trajectory based on the data, such as instruction associated with the impact, generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data, such as an instruction associated with the impact from perception system 402 and control system 408 controls operation of the vehicle. In some examples, control system 408 receives data, such as an instruction associated with the impact, from perception system 402 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where an instruction is indicative of a minimum risk maneuver (MRM), control system 408 transmits a control signal to cause DBW system 202h, powertrain control system 204, and steering control system 206 to adjust operation of vehicle 200, thereby causing vehicle 200 to perform an MRM. Additionally, or alternatively, control system 408 generates and transmits control signals to cause other devices (e.g., headlights, turn signal, door locks, windshield wipers, and/or the like) of vehicle 200 to change states to perform an MRM.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for monitoring a microphone array and/or determining one or more impacts on a microphone array). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
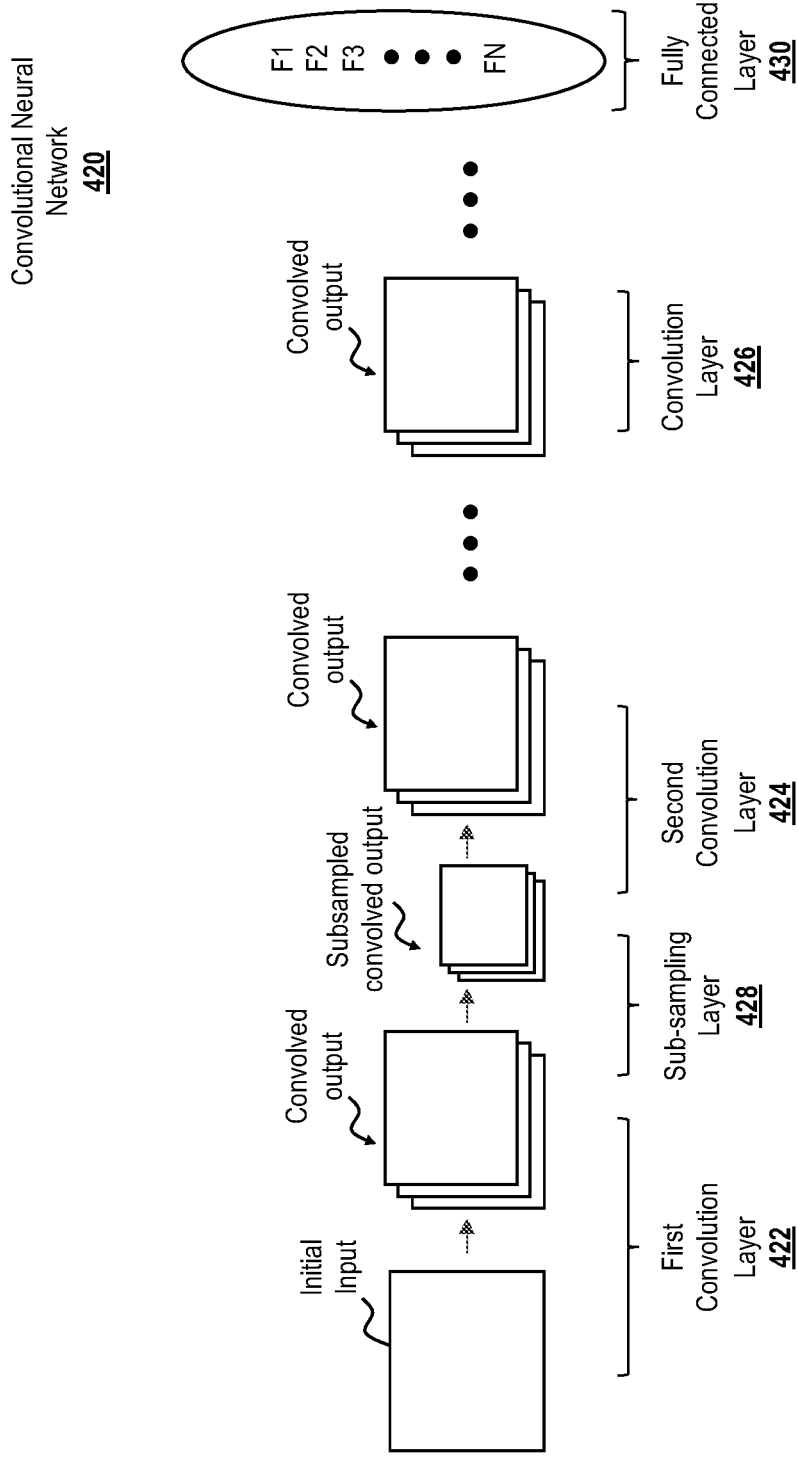
FIG. 4B is a diagram of an implementation of a neural network.

Referring now to FIG. 4B, illustrated is a diagram of an implementation of a machine learning model, e.g. as part of comparator 510 or monitor system 504a. More specifically, illustrated is a diagram of an implementation of the comparator or comparator neural network as a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input. Microphone input signals 507, such as microphone input signals 507-1, 507-2, . . . , 507-N, e.g. in the form of spectrograms (FFT or mel), can form the initial input to the CNN 420. The initial input can be a vector with N times M values or an N×M matrix, where N is the number of microphones in the microphone array and M is the number of bins in the FFT or mel. Outputs from an anomaly detector device or from an event classifier device can be used as initial output to the CNN 420, see FIGS. 5B and 5C.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data/microphone input signals as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data/microphone input signals associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, microphone data and/or the like).

In some embodiments, CNN 420 generates an output based on perception system 420 performing convolution operations associated with each convolution layer. In some examples, CNN 420 generates an output based on perception system 420 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. The feature values are indicative of impacts of a set of impacts, such as likelihoods of impacts of a set of impacts. In this example, the output of convolution layer 426 includes data associated with a plurality of output feature values that represent different impacts in a set of impacts.

In some embodiments, perception system 402 identifies an impact from among a plurality or set of impacts based on perception system 402 identifying a feature value that is associated with the highest likelihood of being the correct impact from among the plurality or set of impacts. For example, where fully connected layer 430 includes feature values F1, F2, . . . FN, and F1 is the greatest feature value, perception system 402 identifies the impact associated with F1 as being the correct impact from among the plurality or set of impacts. In some embodiments, perception system 402 trains CNN 420 to generate the impact. In some examples, perception system 402 trains CNN 420 to generate the impact based on perception system 402 providing training data associated with the impact to CNN 420.

Figure 4C:
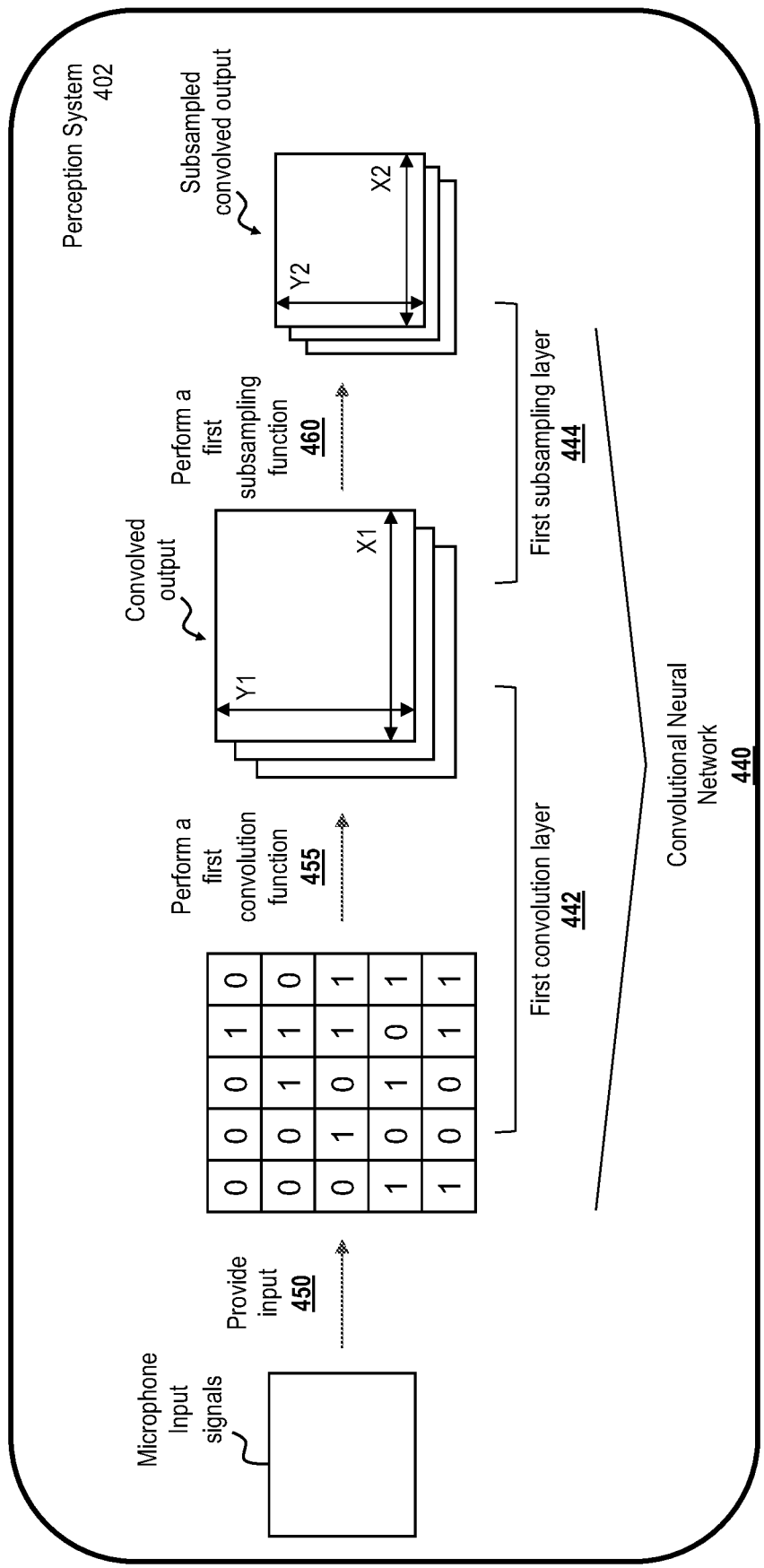
FIGS. 4C and 4D are a diagram illustrating example operation of a CNN.
Figure 4D:
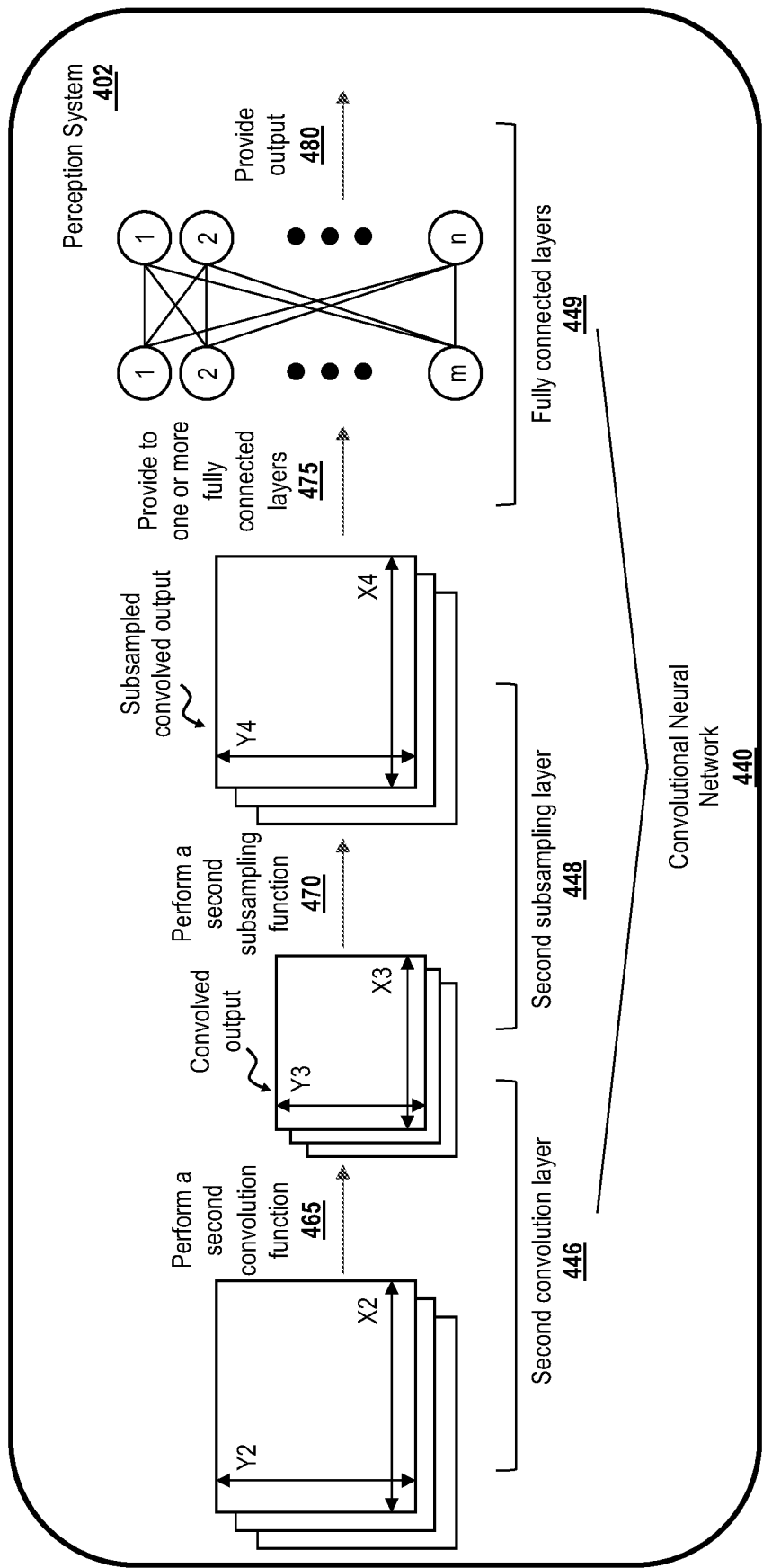

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data or microphone input signals associated with audio received by microphones of a microphone array, e.g. microphone array 506, as input to CNN 440 (step 450). For example, as illustrated, perception system 402 provides the data associated with the audio, such as spectrograms of microphone input signals, to CNN 440, where the audio is spectrograms represented as values stored in a two-dimensional (2D) array as illustrated or a vector.

At step 455, CNN 440 performs a first convolution function. For example, CNN 440 performs the first convolution function based on CNN 440 providing the values representing the microphone input signals/audio as input to one or more neurons (not explicitly illustrated) included in first convolution layer 442. In this example, the values representing the microphone input signals/audio can correspond to values representing a frequency range of the microphone input signals/audio (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In successive convolution layers, the filters associated with neurons can be configured to identify successively more complex patterns in the microphone signals.

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 can be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification) of an impact. The prediction can include an indication that an impact included or represented in the microphone input signals provided as input to CNN 440 includes an impact, a set of impacts, and/or the like. In some embodiments, perception system 402 performs one or more operations and/or provides the data associated with the prediction or classification of impact(s) to a different system, described herein.

Referring now to FIGS. 5A-5F, illustrated are diagrams of an implementation 500 of an autonomous vehicle with microphone safety. In some embodiments, implementation 500 includes a system, such as autonomous system 202, an AV (e.g. illustrated in FIGS. 2, 3 and 4), an AV system, a remote AV system, a fleet management system, and/or a V2I system. In some embodiments, implementation or system 500 includes a microphone array 506 and AV compute 504. The AV compute 504 optionally comprises monitor system 504a. In some embodiments, the system 500 is comprised in, the same as or similar to vehicle 102a, vehicle 200, device 300, AV compute 400.

The present disclosure relates to systems, methods, and computer program products that provide for microphones and microphone arrays to be used in autonomous driving or other applications, where functional safety of the microphone array is of importance. Further, an AV's awareness of the surrounding environment can be improved allowing for improved control of the AV. Microphones, their functional safety, and subsequent microphone data, such a microphone input signals, can be affected by many factors, such as collisions, malfunction, defects, wear, erroneous calibrations, precipitation and/or other weather factors. For example, heat, cold, rain, snow, sleet, fog, dust, mist, hail, smoke, and others can cause reduced or erroneous microphone sensitivity.

Disclosed herein is a system, such as system 500 of FIGS. 5A-5F. In one or more example systems, the system 500, such as vehicle 502, can include a microphone array 506 comprising a plurality of microphones, such as N microphones 506-1, 506-2, . . . , 506-N, where N is 2, 3, 4, 5 or more, for provision of respective microphone input signals 507-1, 507-2, . . . , 507-N. In other words, microphone array 506 can include a first microphone 506-1 for provision of first microphone input signal 507-1, a second microphone 506-2 for provision of second microphone input signal 507-2, and optionally a third microphone 506-3 for provision of third microphone input signal 507-3. In one or more example systems, the microphone array 506 is arranged in the front, such as in the front bumper, of the vehicle. In one or more example systems, the microphone array 506 is arranged in the rear, such as in the rear bumper, of the vehicle.

In one or more example systems, the system 500, such as vehicle 502 and/or AV compute 504 and/or monitor system 504a, can include at least one processor and at least one interface. In one or more example systems, the system 500, such as AV compute 504 and/or monitor system 504a, can include at least one memory storing instructions thereon that, when executed by the at least one processor, cause the at least one processor to obtain, using the microphone array and the at least one processor, a plurality of microphone input signals 507 including a first microphone input signal 507-1 and a second microphone input signal 507-2; to obtain, using the microphone array 506 and the at least one processor, a plurality of microphone input signals 507 including microphone input signals 507-1, 507-2, . . . , 507-N from respective N microphones 506-1, 506-2, . . . , 506-N; to determine, using the at least one processor, an impact on the microphone array based on the first microphone input signal 507-1 and the second microphone input signal 507-1, such as based on microphone input signals 507-1, 507-2, . . . , 507-N from respective N microphones 506-1, 506-2, . . . , 506-N of microphone array 506, e.g. to determine 514, using monitor system 504a, an impact on the microphone array based on the first microphone input signal 507-1 and the second microphone input signal 507-1. In other words, the determination of an impact on the microphone array can be seen as the determination that there is an impact on the microphone array, such as on at least one microphone of the microphone array. An impact can be seen as a detrimental effect and/or a detrimental consequence on the microphone array. The impact can be detrimental to the correct functioning of the microphone array. The impact can be a temporary impact.

The impact can be a short-term impact indicative of a collision, e.g. of a first type and/or of a second type. A long-term impact can be defined as an impact over a time-span of less than 1 minute, such as less than 10 seconds. The impact can be a long-term impact indicative of microphone defect(s) or other changes in microphone properties. A long-term impact can be defined as an impact over a time-span of more than 1 minute, such as more than 1 day. The impact can be an intermediate-term impact indicative of an intermediate or temporary impact. An intermediate-term impact can be defined as an impact over a time-span of in the range from 1 minute to 1 day.

In one or more example systems, the system 500, such as AV compute 504 and/or monitor system 504a, can include at least one memory storing instructions thereon that, when executed by the at least one processor, cause the at least one processor to provide, via the interface and using the at least one processor, an instruction associated with the impact, e.g., to transmit 516, from the monitor system, to control system 504b, an instruction associated with the impact. For example, the instruction can be a first instruction, such as a minimum risk maneuver (MRM), or other vehicle control instructions, in accordance with the impact being a first impact, such as a short-term impact. For example, the instruction can be a second instruction, such as a degraded mode instruction, a service instruction (indicative of required service on the microphone array), or other vehicle control instructions, in accordance with the impact being a second impact, such as a long-term impact. The system 500, such as AV compute 504 and/or monitor system 504a, can provide the instruction to a control system 512 of the system 500, such as control system 408, 504b or safety controller 202g. As illustrated in FIG. 5F, control system 504b can be configured to generate 518 a control signal in response to the instruction from monitor system 504a and to transmit 520 the control signal to DBW system 522 or 202h, e.g. to perform an MRM.

Some of the advantages of the disclosed systems, methods, and computer program products include provision of an increase in the number of available sensor types or modalities in sensor suite available for AV's by improving the functional safety of a microphone array, in particular by monitoring and detecting malfunction of the microphones and/or deviations in the microphone input signals, e.g. caused by collisions. By virtue of implementation of certain techniques described herein, autonomous vehicles (AVs) can benefit from an increased sensor modality and reliability thereby improving operational safety of a specific autonomous vehicle, or a fleet of autonomous vehicles.

In one or more example systems, to determine, using the at least one processor, an impact on the microphone array 506 based on the first microphone input signal 507-1 and the second microphone input signal 507-2 comprises to provide, using the at least one processor, a first input and/or a second input to a comparator, such as a comparator neural network 510. The first input can be based on the first microphone input signal 507-1 and/or one or more further microphone input signals, e.g., the second microphone signal 507-2. The second input can be based on the second microphone input signal 507-2 and/or one or more further microphone input signals, e.g., the first microphone signal 507-1.

Figure 5A:
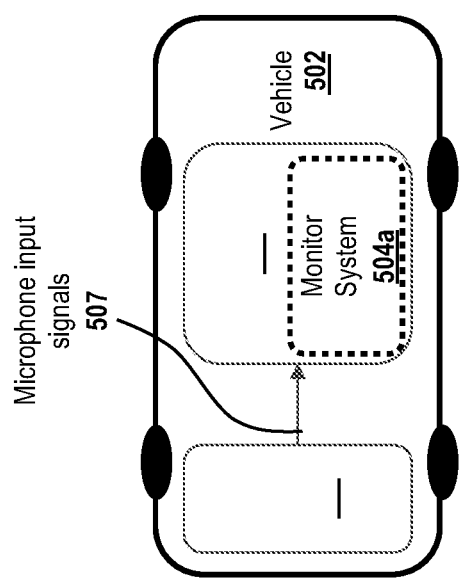
FIGS. 5A-5F are diagrams of an implementation of systems and devices of an autonomous vehicle with microphone safety.
Figure 5B:
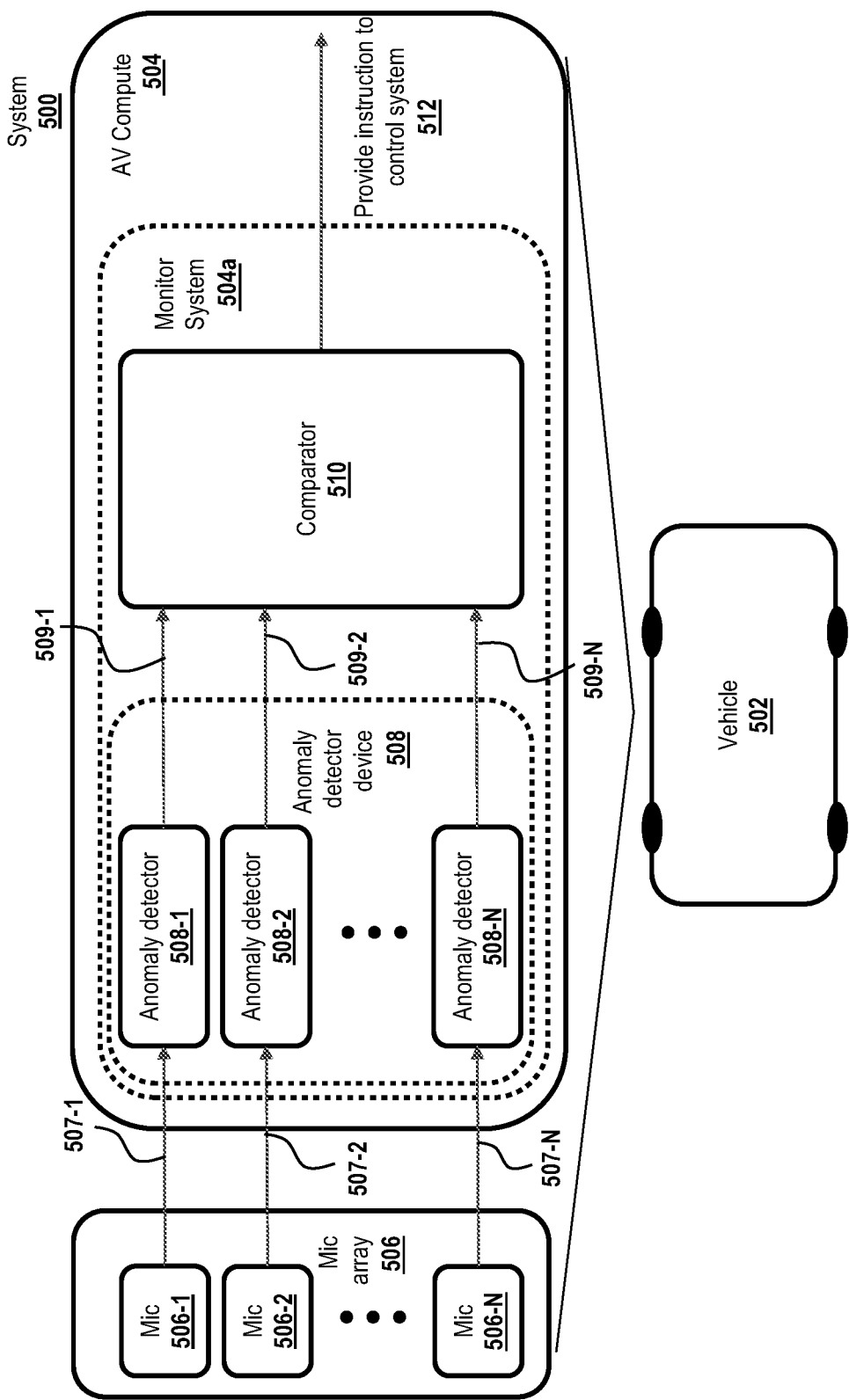

For, example, referring now to FIG. 5B, the system, such as monitor system 504a, can include anomaly detector device 508 comprising anomaly detectors 508-1, 508-2, . . . , 508-N configured to detect anomalies in respective microphone input signals 507-1, 507-2, . . . , 507-N. The output of first anomaly detector 508-1 is indicative of an anomaly in the first microphone input signal 507-1 and forms first input 509-1, the output of second anomaly detector 508-2 is indicative of an anomaly in the second microphone input signal 507-2 and forms second input 509-2, and the output of the N'th anomaly detector 508-N is indicative of an anomaly in the N'th microphone input signal 507-N and forms N'th input 509-N. In other words, the first input 509-1 can be indicative of an anomaly in the first microphone input signal, e.g. using first anomaly detector and/or the second input 509-2 can be indicative of an anomaly in the second microphone input signal, e.g. using second anomaly detector.

Figure 5C:
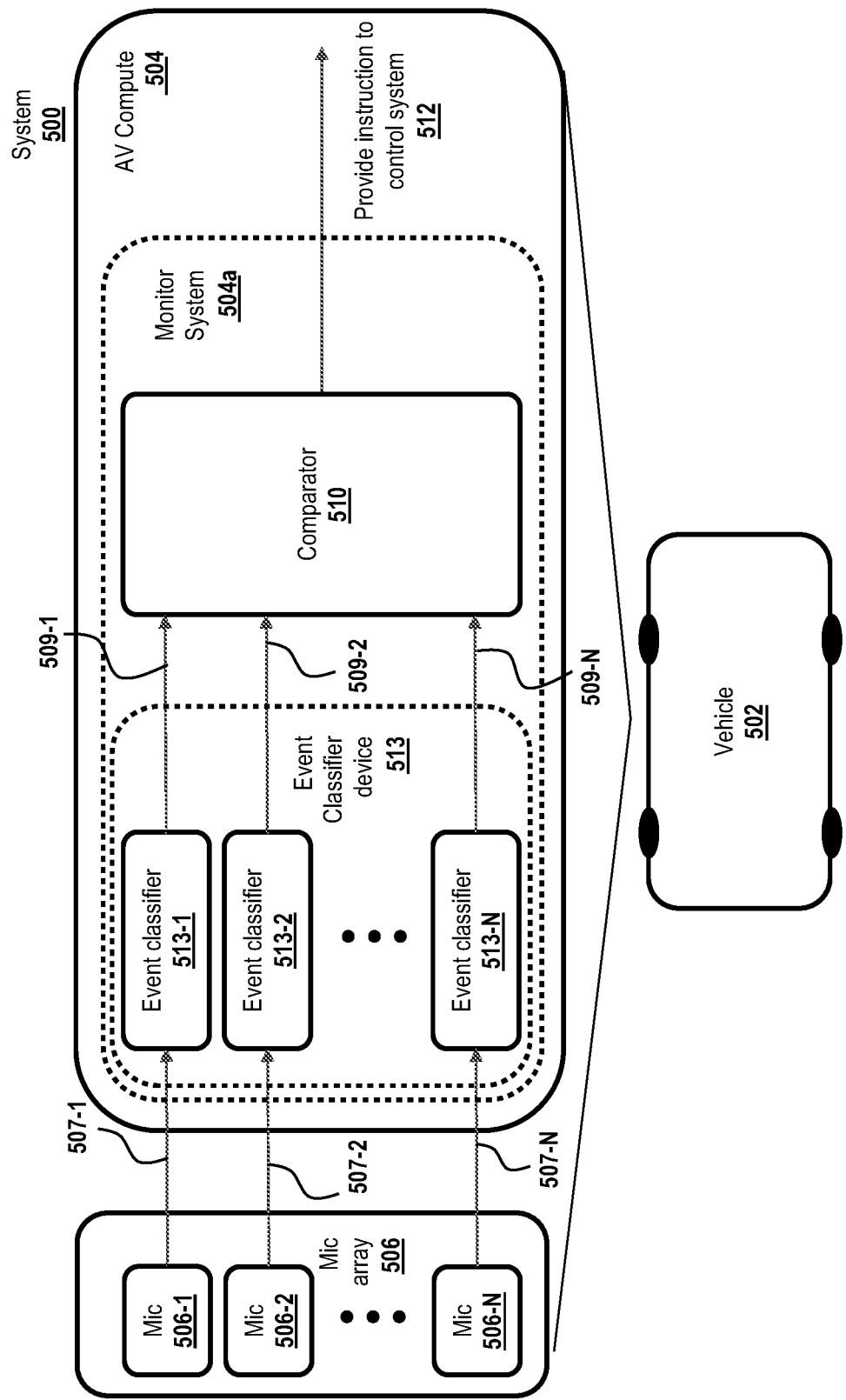
Figure 5D:
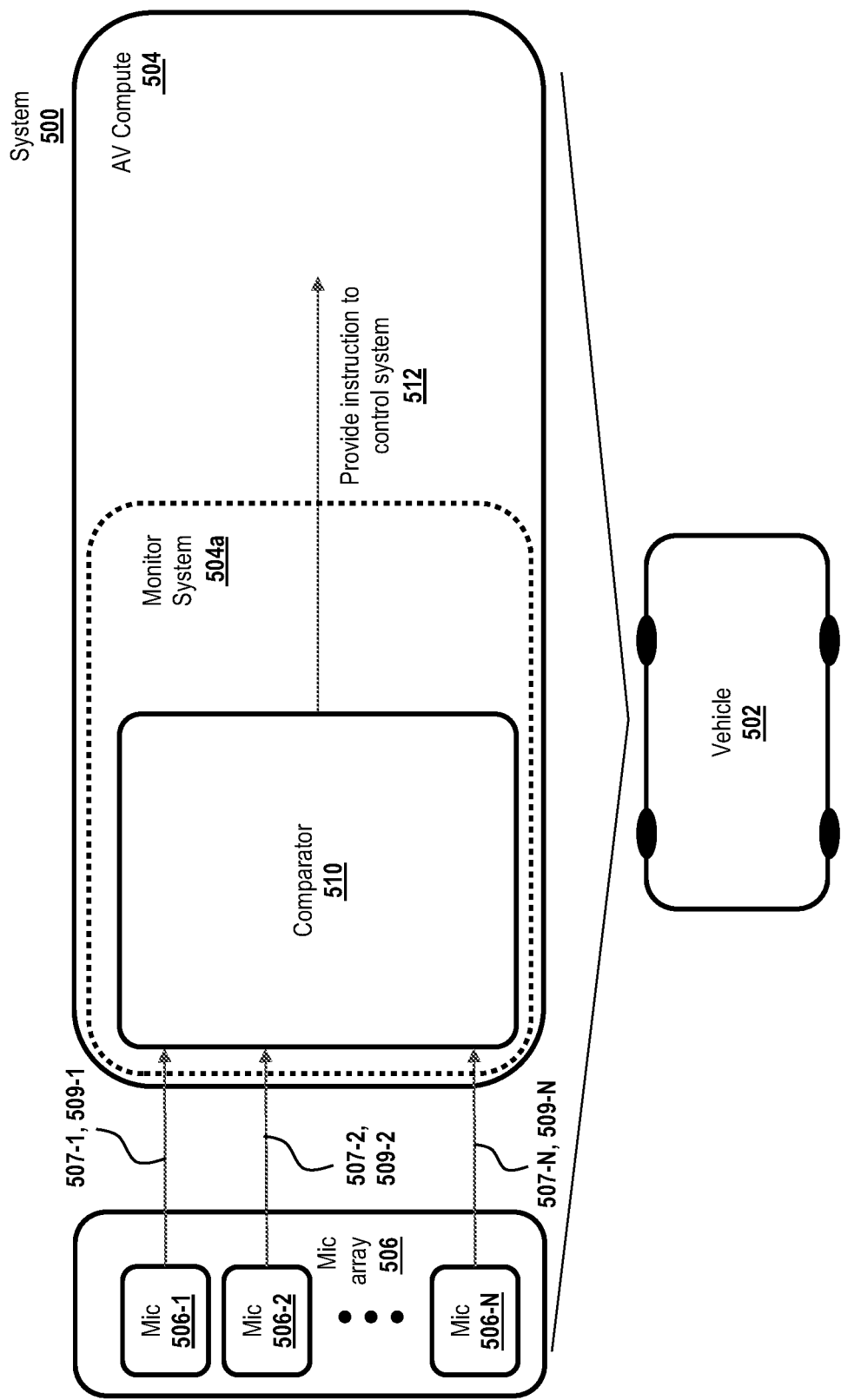
Figure 5E:
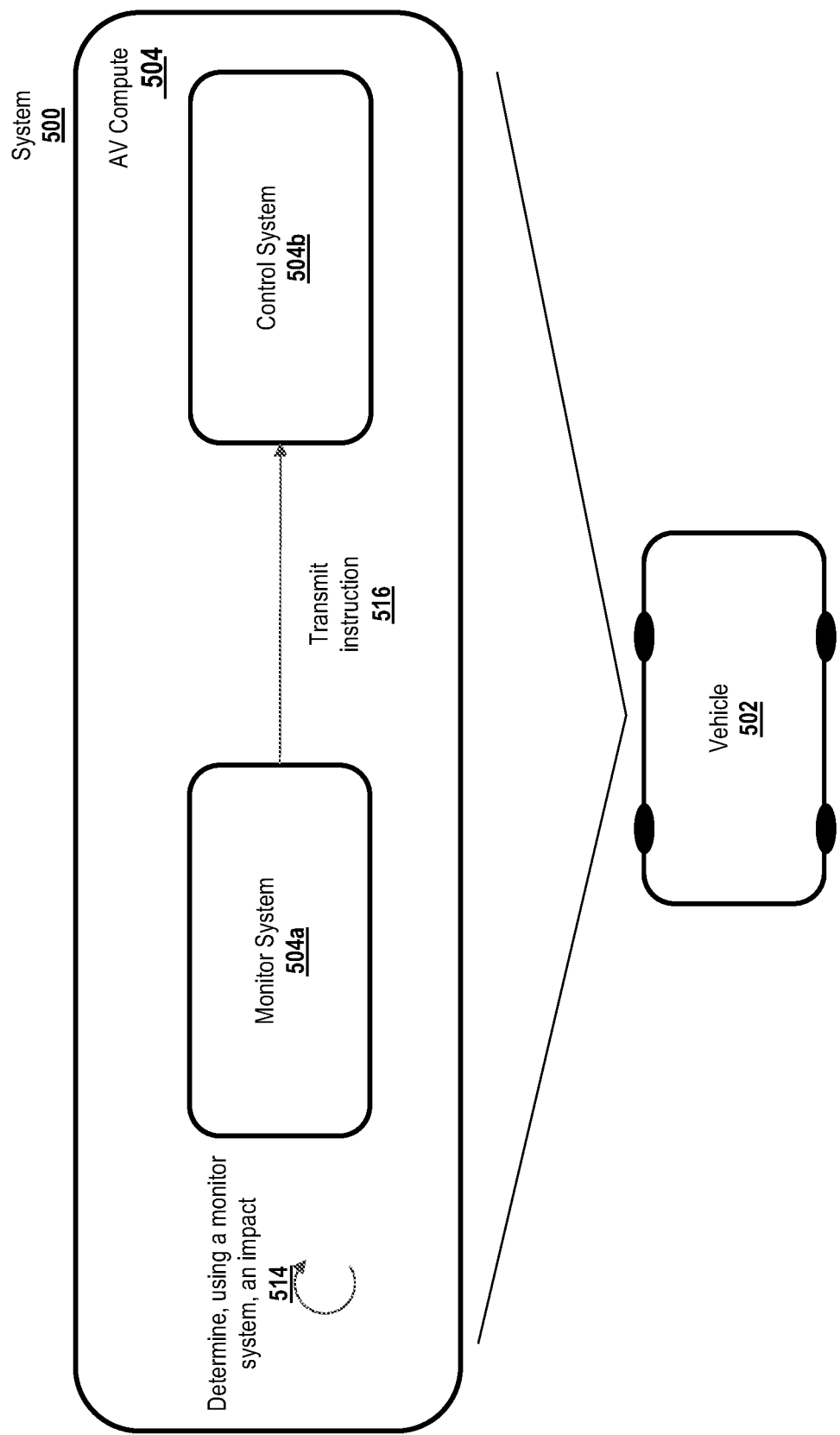
Figure 5F:
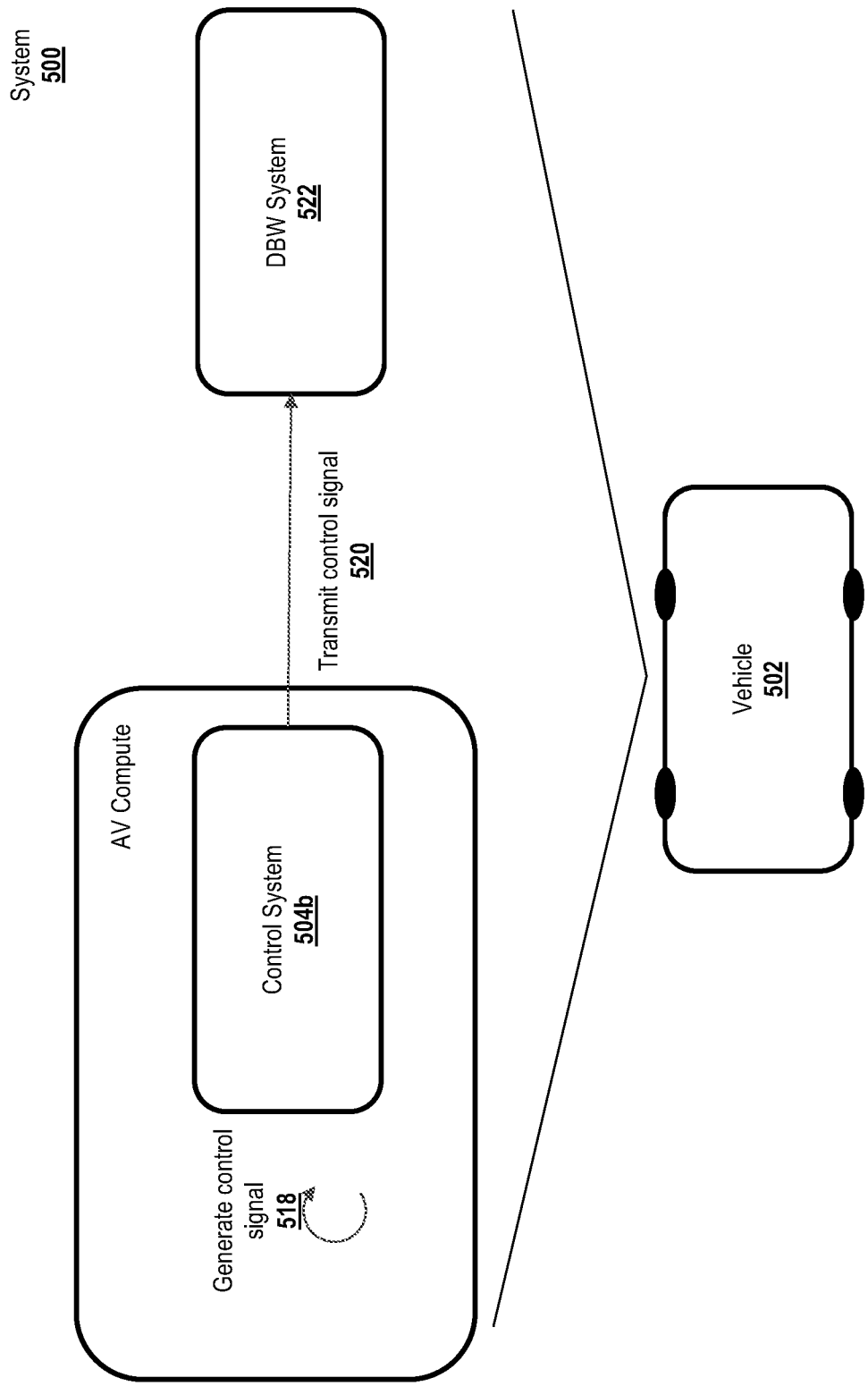

For example, referring now to FIG. 5C, the system, such as monitor system 504a, can include event classifier devices 513 comprising event classifiers 513-1, 513-2, . . . , 513-N configured to detect and/or classify events in respective microphone input signals 507-1, 507-2, . . . , 507-N. The output of first event classifier 513-1 is indicative of an event in the first microphone input signal 507-1 and forms first input 509-1, the output of second event classifier 513-2 is indicative of an event in the second microphone input signal 507-2 and forms second input 509-2, and the output of the N'th event classifier 513-N is indicative of an event in the N'th microphone input signal 5087-N and forms N'th input 509-N. N can denote a positive integer. In other words, the first input 509-1 can be indicative of an event in the first microphone input signal, e.g. using first event classifier, and/or the second input 509-2 can be indicative of an event in the second microphone input signal, e.g. using second event classifier.

In one or more example systems, to determine, using the at least one processor, an impact on the microphone array based on the first microphone input signal 507-1 and the second microphone input signal 507-2 comprises to apply the comparator neural network 510 to the first input 509-1 and/or the second input 509-2; and to provide, from the comparator neural network 510 using the at least one processor, impact data indicative of the impact for determining the impact.

In one or more example systems, such as system 500 in FIGS. 5A-5F, the comparator neural network 510 comprises a Siamese neural network, and wherein applying the comparator neural network 510 to the first input and the second input optionally comprises applying the Siamese neural network to the first input and the second input. In other words, the first input and the second input can be fed to the comparator neural network. Stated differently, the Siamese neural network can be seen as a neural network taking in tandem at least the first input (e.g. first microphone input signal as first input vector) and the second input (e.g. second microphone input signal as second input vector) to compute comparable impact data, e.g. comparable impact vectors or impact values as output vectors.

In one or more example systems, such as system 500 in FIGS. 5A-5F, the comparator neural network 510 comprises a multilayer neural network and wherein to apply the comparator neural network to the first input and the second input comprises to apply the multilayer neural network to the first input and the second input. The multilayer neural network can include or be a temporal neural network, such as a Recurrent Neural Network and/or a Temporal Convolutional Network (TCN). The multilayer neural network can include or be a Convolutional Neural Network (for example the Convolutional Neural Network illustrated in FIGS. 4A-4D).

In one or more example systems, such as system 500 in FIGS. 5A-5F, to determine, using the at least one processor, an impact on the microphone array based on the first microphone input signal and the second microphone input signal comprises to determine, using the at least one processor, a first output associated with a first microphone based on the first microphone input signal. The first output can be from or based on the first input to comparator neural network, e.g., corresponding to or being the output of a first anomaly detector and/or a first event classifier.

In one or more example systems, such as system 500 in FIGS. 5A-5F, to determine, using the at least one processor, an impact on the microphone array based on the first microphone input signal and the second microphone input signal comprises to determine, using the at least one processor, a second output associated with a second microphone based on the second microphone input signal. The second output can be from or based on the second input to comparator neural network, e.g., corresponding to or being the output of a second anomaly detector and/or a second event classifier.

In one or more examples, such as system 500 in FIGS. 5A-5F, to determine, using the at least one processor, an impact on the microphone array based on the first microphone input signal and the second microphone input signal comprises to compare, using the at least one processor, the first output and the second output for determining the impact.

In one or more examples, such as system 500 in FIGS. 5A-5F, to determine, using the at least one processor, an impact on the microphone array based on the first microphone input signal and the second microphone input signal comprises to select, using the at least one processor, the impact from a set of impacts. To select the impact from a set of impacts can include to select the impact with highest probability or likelihood, such as based on an output of a neural network model, e.g., comparator neural network as described herein.

Figure 6:
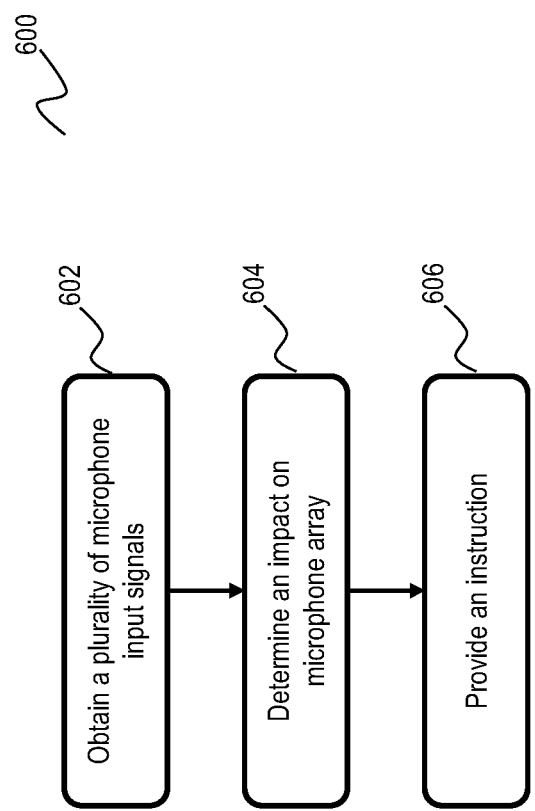
FIG. 6 is a flowchart of a method for monitoring a microphone array of an autonomous vehicle.

In one or more examples, such as system 500 in FIGS. 5A-5F, and/or one or more example methods, such as method 600 in FIG. 6, the set of impacts comprises a first impact being a short-term impact indicative of a collision.

In one or more examples, such as system 500 in FIGS. 5A-5F, and/or one or more example methods, such as method 600 in FIG. 6, the set of impacts comprises a second impact being a long-term impact indicative of microphone defect.

In one or more examples, such as system 500 in FIGS. 5A-5F, and/or one or more example methods, such as method 600 in FIG. 6, the set of impacts comprises an impact indicative of malfunction of a microphone.

In one or more examples, such as system 500 in FIGS. 5A-5F, and/or one or more example methods, such as method 600 in FIG. 6, the set of impacts comprises an impact indicative of a covered or muffled microphone.

In one or more examples, such as system 500 in FIGS. 5A-5F, and/or one or more example methods, such as method 600 in FIG. 6, the set of impacts comprises an impact indicative of digital audio clipping.

In one or more examples, such as system 500 in FIGS. 5A-5F, and/or one or more example methods, such as method 600 in FIG. 6, the set of impacts comprises an impact indicative of collision of a first type, such as a collision with a hard object, e.g., a metallic object.

In one or more examples, such as system 500 in FIGS. 5A-5F, and/or one or more example methods, such as method 600 in FIG. 6, the set of impacts comprises an impact indicative of collision of a second type, such as a collision with a soft object, e.g. a living being, such as a human or animal.

In one or more examples, such as system 500 in FIGS. 5A-5F, and/or one or more example methods, such as method 600 in FIG. 6, the set of impacts comprises an impact indicative of rain or splashing water.

In one or more examples, such as system 500 in FIGS. 5A-5F, and/or one or more example methods, such as method 600 in FIG. 6, the set of impacts comprises an impact indicative of no impact.

In one or more examples, such as system 500 in FIGS. 5A-5F, to obtain the first microphone input signal comprises to determine, using the at least one processor, a first waveform representation of the first microphone input signal, and to determine, using the at least one processor, an impact on the microphone array based on the first waveform representation of the first microphone input signal.

In one or more examples, such as system 500 in FIGS. 5A-5F, to obtain the second microphone input signal comprises to determine, using the at least one processor, a second waveform representation of the second microphone input signal, and to determine, using the at least one processor, an impact on the microphone array based on the second waveform representation of the second microphone input signal.

In one or more examples, such as system 500 in FIGS. 5A-5F, to obtain the first microphone input signal comprises to determine, using the at least one processor, a first spectrogram of the first microphone input signal, and to determine, using the at least one processor, an impact on the microphone array based on the first spectrogram of the first microphone input signal. In other words, the first microphone input signal 507-1 can be a first spectrogram. The first spectrogram can be an M-bin Fast Fourier Transform (FFT), e.g. with M in the range from 4 to 50. The first spectrogram can be a mel spectrogram or a log-scale mel.

In one or more examples, such as system 500 in FIGS. 5A-5F to obtain the second microphone input signal comprises determining, using the at least one processor, a second spectrogram of the second microphone input signal and wherein determining, using the at least one processor, an impact on the microphone array is based on the second spectrogram of the second microphone input signal. In other words, the second microphone input signal 507-2 can be a second spectrogram. The second spectrogram can be an M-bin Fast Fourier Transform (FFT), e.g., with M in the range from 4 to 50. The second spectrogram can be a mel spectrogram or a log-scale mel.

In one or more examples, such as system 500 in FIGS. 5A-5F, the system 500 can include at least one memory storing instructions thereon that, when executed by the at least one processor, cause the at least one processor to obtain, using the microphone array and the at least one processor, a third microphone input signal; and to determine, using the at least one processor, an impact on the microphone array based on the first microphone input signal, the second microphone input signal, and the third microphone input signal. A system with three or more microphones in the microphone array 506 allows for an improved detection of microphone malfunction or defects and collisions.

In one or more examples, such as system 500 in FIGS. 5A-5F, the system 500 can include at least one memory storing instructions thereon that, when executed by the at least one processor, cause the at least one processor to determine whether a monitor criterion is satisfied; and in accordance with a determination that the monitor criterion is satisfied, to perform the determining of an impact on the microphone array based on the first microphone input signal and the second microphone input signal, and to provide an instruction associated with the impact. Conditional application of the comparator allows for a power and computationally efficient monitoring of the microphone array while providing sufficient functional safety of the microphone array.

Referring now to FIG. 6, illustrated is a flowchart of a method or process 600 for systems and methods for an autonomous vehicle with microphone safety, such as a method, e.g. for operating and/or controlling an AV. The method can be performed by a system disclosed herein, such as an AV compute 400, and a vehicle 102, 200, of FIGS. 1, 2, 3, 4 and the system 500 of FIGS. 5A-5F.

In one or more examples, the method 600 can include obtaining, at step 602, using a microphone array, such as microphone array 506, and at least one processor, a plurality of microphone input signals including a first microphone input signal and a second microphone input signal. In one or more example methods, the method 600 can include determining, at step 604, using the at least one processor, an impact on the microphone array based on the first microphone input signal and the second microphone input signal. In one or more example methods, the method 600 can include providing, at step 606, via an interface and using the at least one processor, an instruction associated with the impact.

The method 600 can be a method of monitoring a microphone array of an autonomous vehicle.

The impact can be a short-term impact, e.g., indicative of or associated with a collision. The impact can be a long-term impact, e.g., indicative of changes in microphone properties, such as microphone characteristics, defect, malfunction, deviation in performance and/or behavior.

The instruction can, e.g., in accordance with the impact being a short-term impact, be a minimum risk maneuver (MRM) or other vehicle control instructions for operating the AV. The instruction can, e.g., in accordance with the impact being a long-term impact, be a degraded mode instruction, a service instruction (indicative of required service on the microphone array), or other vehicle control instructions, in accordance with the impact being a long-term impact.

In one or more examples, the determining, at step 604, using the at least one processor, an impact on the microphone array based on the first microphone input signal and the second microphone input signal comprises providing, using the at least one processor, a first input and/or a second input to a comparator neural network, wherein the first input is based on the first microphone input signal and/or the second input is based on the second microphone input signal; applying the comparator neural network, e.g. in AV compute 504 or monitor system 504a, to the first input and the second input; and providing, from the comparator neural network using the at least one processor, impact data indicative of the impact for determining the impact.

In one or more examples, the comparator neural network comprises a Siamese neural network, and wherein applying the comparator neural network to the first input and the second input comprises applying the Siamese neural network to the first input and the second input.

In one or more examples, the comparator neural network comprises a multilayer neural network and wherein applying the comparator neural network to the first input and the second input comprises to apply the multilayer neural network to the first input and the second input. The multilayer neural network can include or be a temporal neural network, such as a Recurrent Neural Network and/or a Temporal Convolutional Network (TCN). The multilayer neural network can include or be a Convolutional Neural Network.

In one or more examples, the determining, at step 604, using the at least one processor, an impact on the microphone array based on the first microphone input signal and the second microphone input signal comprises determining, using the at least one processor, a first output associated with a first microphone based on the first microphone input signal; determining, using the at least one processor, a second output associated with a second microphone based on the second microphone input signal; and comparing, using the at least one processor, the first output and the second output for determining the impact.

In more examples, the determining, at step 604, the impact comprises selecting, using the at least one processor, the impact from a set of impacts, for example by selecting the impact of the set of impacts with the highest probability. In one or more example methods and/or systems, the impact can be based on or given by an output of a neural network model.

The set of impacts can comprise one or more of a first impact being a short-term impact indicative of a collision; a second impact being a long-term impact indicative of microphone defect; an impact indicative of malfunction of a microphone; an impact indicative of a covered or muffled microphone; an impact indicative of digital audio clipping; an impact indicative of collision of a first type, e.g., a collision with a hard object, such as metallic object; an impact indicative of collision of a second type, e.g., a collision with a soft object; and an impact indicative of rain or splashing water.

In one or more examples, the obtaining, at step 602, the first microphone input signal comprises determining, using the at least one processor, a first waveform representation of the first microphone input signal and wherein determining, at step 604, using the at least one processor, an impact on the microphone array is based on the first waveform representation of the first microphone input signal.

In one or more examples, the obtaining, at step 602, the second microphone input signal comprises determining, using the at least one processor, a second waveform representation of the second microphone input signal and wherein determining, at step 604, using the at least one processor, an impact on the microphone array is based on the second waveform representation of the second microphone input signal.

In one or more examples, the obtaining, at step 602, the first microphone input signal comprises determining, using the at least one processor, a first spectrogram of the first microphone input signal and wherein determining, at step 604, using the at least one processor, an impact on the microphone array is based on the first spectrogram of the first microphone input signal.

In one or more examples, the obtaining, at step 602, the second microphone input signal comprises determining, using the at least one processor, a second spectrogram of the second microphone input signal and wherein determining, at step 604, using the at least one processor, an impact on the microphone array is based on the second spectrogram of the second microphone input signal.

In one or more examples, the method 600 comprises, at step 602, obtaining, using the microphone array and the at least one processor, a third microphone input signal; and determining, at step 604, using the at least one processor, an impact on the microphone array based on the first microphone input signal, the second microphone input signal, and the third microphone input signal.

In one or more examples, the method 600 comprises determining whether a monitor criterion is satisfied; and in accordance with determining that the monitor criterion is satisfied, performing the determining, at step 604, of an impact on the microphone array based on the first microphone input signal and the second microphone input signal, and providing an instruction associated with the impact.

In one or more examples, the method 600 can further include controlling an operation of a vehicle in a fleet of autonomous vehicles based on the instruction.

Figure 7:
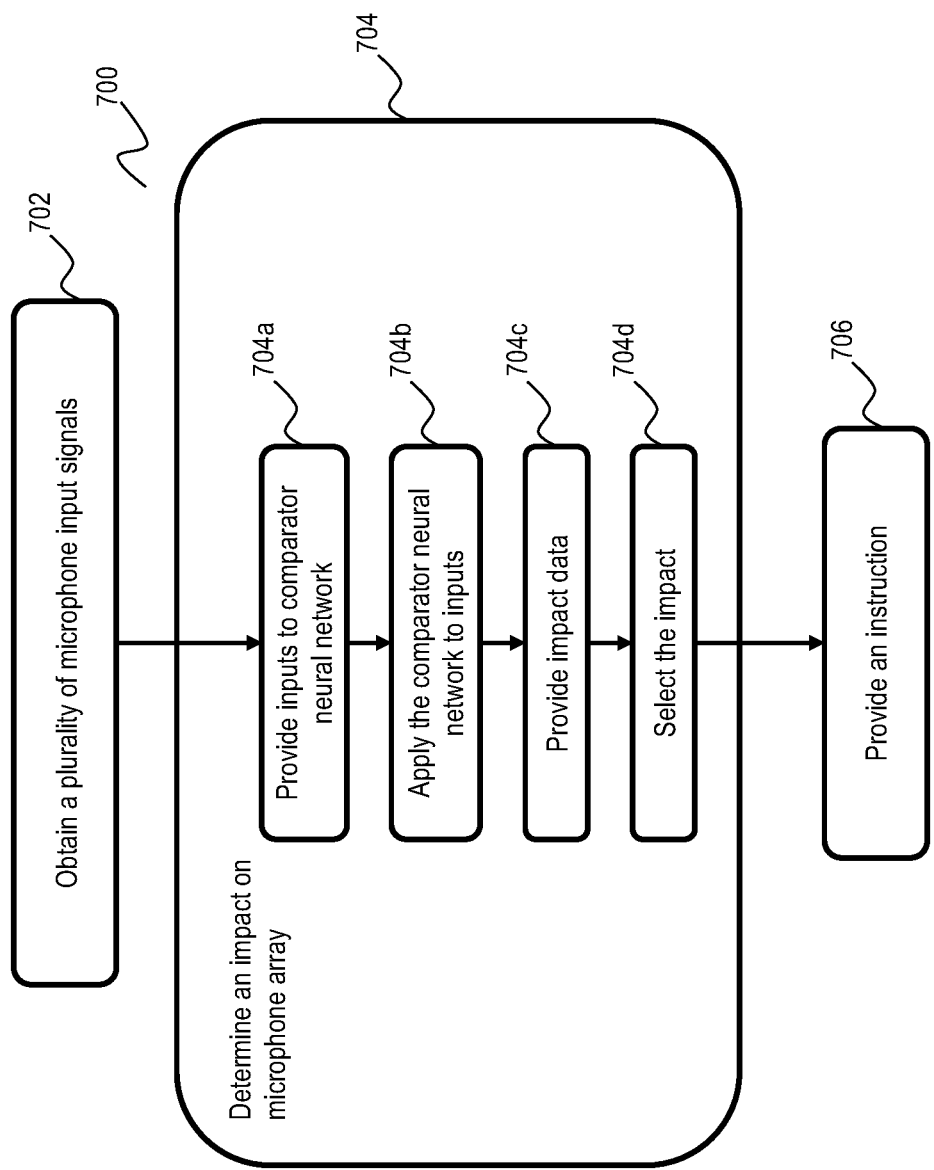
FIG. 7 is a flowchart of a method for monitoring a microphone array of an autonomous vehicle.

Referring now to FIG. 7, illustrated is a flowchart of a method or process 700 for systems and methods for an autonomous vehicle with microphone safety, such as a method, e.g. for operating and/or controlling an AV. The method 700 can be performed in whole or in part by a system disclosed herein, such as an AV compute 400, and a vehicle 102, 200, of FIGS. 1, 2, 3, 4 and the system 500 of FIGS. 5A-5F.

Disclosed herein is a method 700. In one or more examples, the method 700 can include obtaining, at step 702, using a microphone array and at least one processor, a plurality of microphone input signals including a first microphone input signal, a second microphone input signal, and a third microphone signal. In one or more examples, the method 700 can include determining, at step 704, using the at least one processor, an impact on the microphone array based on the first microphone input signal, the second microphone input signal, and the third microphone input signal, wherein determining, at step 704, using the at least one processor, an impact on the microphone array based on the first microphone input signal, the second microphone input signal, and the third microphone input signal comprises providing, at step 704a, using the at least one processor, a first input, a second input, and a third input to a comparator neural network, wherein the first input is based on the first microphone input signal, the second input is based on the second microphone input signal, and the third input is based on the third microphone input signal, and applying, at step 704b, the comparator neural network to the first input, the second input, and the third input. In one or more examples, the method 700 can include providing, at step 704c, from the comparator neural network using the at least one processor, impact data indicative of the impact for determining the impact, and selecting, at step 704d, using the at least one processor, the impact from a set of impacts comprising a first impact being a short-term impact indicative of a collision and a second impact being a long-term impact indicative of microphone defect. In one or more examples, the method 700 can include providing, at step 706, via an interface and using the at least one processor, an instruction associated with the impact.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Also disclosed are methods, non-transitory computer readable media, and systems according to any of the following items:

Item 1. A method comprising:
  obtaining, using a microphone array and at least one processor, a plurality of microphone input signals including a first microphone input signal and a second microphone input signal;
  determining, using the at least one processor, an impact on the microphone array based on the first microphone input signal and the second microphone input signal; and providing, via an interface and using the at least one processor, an instruction associated with the impact.

Item 2. The method according to item 1, wherein determining, using the at least one processor, an impact on the microphone array based on the first microphone input signal and the second microphone input signal comprises:
  providing, using the at least one processor, a first input and a second input to a comparator neural network, wherein the first input is based on the first microphone input signal and the second input is based on the second microphone input signal;
  applying the comparator neural network to the first input and the second input; and
  providing, from the comparator neural network using the at least one processor, impact data indicative of the impact for determining the impact.

Item 3. The method according to item 2, wherein the comparator neural network comprises a Siamese neural network, and wherein applying the comparator neural network to the first input and the second input comprises applying the Siamese neural network to the first input and the second input.

Item 4. The method according to any one of items 2-3, wherein the comparator neural network comprises a multilayer neural network, and wherein applying the comparator neural network to the first input and the second input comprises applying the multilayer neural network to the first input and the second input.

Item 5. The method according to any one of items 1-4, wherein determining, using the at least one processor, an impact on the microphone array based on the first microphone input signal and the second microphone input signal comprises:
  determining, using the at least one processor, a first output associated with a first microphone based on the first microphone input signal;
  determining, using the at least one processor, a second output associated with a second microphone based on the second microphone input signal; and
  comparing, using the at least one processor, the first output and the second output for determining the impact.

Item 6. The method according to any one of items 1-5, wherein determining the impact comprises selecting, using the at least one processor, the impact from a set of impacts.

Item 7. The method according to item 6, wherein the set of impacts comprises a first impact being a short-term impact indicative of a collision.

Item 8. The method according to any one of items 6-7, wherein the set of impacts comprises a second impact being a long-term impact indicative of microphone defect.

Item 9. The method according to any one of claims 6-8, wherein the set of impacts comprises an impact indicative of malfunction of a microphone.

Item 10. The method according to any one of claims 6-9, wherein the set of impacts comprises an impact indicative of a covered or muffled microphone.

Item 11. The method according to any one of claims 6-10, wherein the set of impacts comprises an impact indicative of digital audio clipping.

Item 12. The method according to any one of claims 6-11, wherein the set of impacts comprises an impact indicative of collision of a first type.

Item 13. The method according to any one of claims 6-12, wherein the set of impacts comprises an impact indicative of collision of a second type.

Item 14. The method according to any one of claims 6-13, wherein the set of impacts comprises an impact indicative of rain or splashing water.

Item 15. The method according to any one of claims 1-14, wherein obtaining the first microphone input signal comprises determining, using the at least one processor, a first waveform representation of the first microphone input signal and wherein determining, using the at least one processor, an impact on the microphone array is based on the first waveform representation of the first microphone input signal.

Item 16. The method according to any one of claims 1-15, wherein obtaining the second microphone input signal comprises determining, using the at least one processor, a second waveform representation of the second microphone input signal and wherein determining, using the at least one processor, an impact on the microphone array is based on the second waveform representation of the second microphone input signal.

Item 17. The method according to any one of claims 1-16, wherein obtaining the first microphone input signal comprises determining, using the at least one processor, a first spectrogram of the first microphone input signal and wherein determining, using the at least one processor, an impact on the microphone array is based on the first spectrogram of the first microphone input signal.

Item 18. The method according to any one of claims 1-17, wherein obtaining the second microphone input signal comprises determining, using the at least one processor, a second spectrogram of the second microphone input signal and wherein determining, using the at least one processor, an impact on the microphone array is based on the second spectrogram of the second microphone input signal.

Item 19. The method according to any one of claims 1-18, wherein the method comprises:
  obtaining, using the microphone array and the at least one processor, a third microphone input signal; and
  determining, using the at least one processor, an impact on the microphone array based on the first microphone input signal, the second microphone input signal, and the third microphone input signal.

Item 20. The method according to any one of claims 1-19, wherein the method comprises:
  determining whether a monitor criterion is satisfied; and
  in accordance with determining that the monitor criterion is satisfied, performing the determining of an impact on the microphone array based on the first microphone input signal and the second microphone input signal, and providing an instruction associated with the impact.

Item 21. A system comprising:
  a microphone array comprising a plurality of microphones;
  at least one processor;
  at least one interface; and
  at least one non-transitory computer readable medium storing instructions that, when executed by the at least one processor, cause the at least one processor to:
    obtain, using the microphone array and the at least one processor, a plurality of microphone input signals including a first microphone input signal and a second microphone input signal;
    determine, using the at least one processor, an impact on the microphone array based on the first microphone input signal and the second microphone input signal; and
    provide, via the interface and using the at least one processor, an instruction associated with the impact.

Item 22. The system of item 21, wherein the instructions that cause the at least one processor to determine, using the at least one processor, an impact on the microphone array based on the first microphone input signal and the second microphone input signal cause the at least one processor to:
  provide, using the at least one processor, a first input and a second input to a comparator neural network, wherein the first input is based on the first microphone input signal and the second input is based on the second microphone input signal;
  apply the comparator neural network to the first input and the second input; and provide, from the comparator neural network using the at least one processor, impact data indicative of the impact for determining the impact.

Item 23. The system of item 22, wherein the comparator neural network comprises a Siamese neural network, and wherein the instructions that cause the at least one processor to apply the comparator neural network to the first input and the second input cause the at least one processor to apply the Siamese neural network to the first input and the second input.

Item 24. The system of any one of items 22-23, wherein the comparator neural network comprises a multilayer neural network, and wherein the instructions that cause the at least one processor to apply the comparator neural network to the first input and the second input cause the at least one processor to apply the multilayer neural network to the first input and the second input.

Item 25. The system of any one of items 21-24, wherein the instructions that cause the at least one processor to determine, using the at least one processor, an impact on the microphone array based on the first microphone input signal and the second microphone input signal cause the at least one processor to:
  determine, using the at least one processor, a first output associated with a first microphone based on the first microphone input signal;
  determine, using the at least one processor, a second output associated with a second microphone based on the second microphone input signal; and
  compare, using the at least one processor, the first output and the second output for determining the impact.

Item 26. The system of any one of items 21-25, wherein the instructions that cause the at least one processor to determine, using the at least one processor, an impact on the microphone array based on the first microphone input signal and the second microphone input signal cause the at least one processor to select, using the at least one processor, the impact from a set of impacts.

Item 27. The system of item 26, wherein the set of impacts comprises a first impact being a short-term impact indicative of a collision.

Item 28. The system of any one of items 26-27, wherein the set of impacts comprises a second impact being a long-term impact indicative of microphone defect.

Item 29. The system of any one of items 26-28, wherein the set of impacts comprises an impact indicative of malfunction of a microphone.

Item 30. The system of any one of items 26-29, wherein the set of impacts comprises an impact indicative of a covered or muffled microphone.

Item 31. The system of any one of items 26-30, wherein the set of impacts comprises an impact indicative of digital audio clipping.

Item 32. The system of any one of items 26-31, wherein the set of impacts comprises an impact indicative of collision of a first type.

Item 33. The system of any one of items 26-32, wherein the set of impacts comprises an impact indicative of collision of a second type.

Item 34. The system of any one of items 26-33, wherein the set of impacts comprises an impact indicative of rain or splashing water.

Item 35. The system of any one of items 21-34, wherein the instructions that cause the at least one processor to obtain the first microphone input signal cause the at least one processor to: determine, using the at least one processor, a first waveform representation of the first microphone input signal and wherein the instructions that cause the at least one processor to determine, using the at least one processor, an impact on the microphone array cause the at least one processor to determine the impact on the microphone array based on the first waveform representation of the first microphone input signal.

Item 36. The system of any one of items 21-35, wherein the instructions that cause the at least one processor to obtain the second microphone input signal cause the at least one processor to determine, using the at least one processor, a second waveform representation of the second microphone input signal and wherein the instructions that cause the at least one processor to determine, using the at least one processor, an impact on the microphone array cause the at least one processor to determine the impact on the microphone array based on the second waveform representation of the second microphone input signal.

Item 37. The system of any one of items 21-36, wherein the instructions that cause the at least one processor to obtain the first microphone input signal cause the at least one processor to determine, using the at least one processor, a first spectrogram of the first microphone input signal and wherein the instructions that cause the at least one processor to determine, using the at least one processor, an impact on the microphone array cause the at least one processor to determine the impact on the microphone array based on the first spectrogram of the first microphone input signal.

Item 38. The system of any one of items 21-37, wherein the instructions that cause the at least one processor to obtain the second microphone input signal cause the at least one processor to determine, using the at least one processor, a second spectrogram of the second microphone input signal and wherein the instructions that cause the at least one processor to determine, using the at least one processor, an impact on the microphone array cause the at least one processor to determine the impact on the microphone array based on the second spectrogram of the second microphone input signal.

Item 39. The system of any one of items 21-38, wherein the instructions that cause the at least one processor to obtain, using the microphone array and the at least one processor, a plurality of microphone input signals cause the at least one processor to obtain, using the microphone array and the at least one processor, a third microphone input signal; and wherein the instructions that cause the at least one processor to determine, using the at least one processor, an impact on the microphone array based on the first microphone input signal and the second microphone input signal cause the at least one processor to determine, using the at least one processor, the impact on the microphone array based on the first microphone input signal, the second microphone input signal, and the third microphone input signal.

Item 40. The system of any one of items 21-39, wherein the instructions further cause the at least one processor to:
  determine whether a monitor criterion is satisfied; and
  in accordance with a determination that the monitor criterion is satisfied, perform to determine an impact on the microphone array based on the first microphone input signal and the second microphone input signal, and provide an instruction associated with the impact.

Item 41. At least one non-transitory storage media storing instructions that, when executed by at least one processor, cause the at least one processor to:
  obtain, using a microphone array and the at least one processor, a plurality of microphone input signals including a first microphone input signal and a second microphone input signal;
  determine, using the at least one processor, an impact on the microphone array based on the first microphone input signal and the second microphone input signal; and provide, via an interface and using the at least one processor, an instruction associated with the impact.

Item 42. The at least one non-transitory storage media of item 41, wherein the instructions that cause the at least one processor to determine, using the at least one processor, an impact on the microphone array based on the first microphone input signal and the second microphone input signal cause the at least one processor to:
  provide, using the at least one processor, a first input and a second input to a comparator neural network, wherein the first input is based on the first microphone input signal and the second input is based on the second microphone input signal;
  apply the comparator neural network to the first input and the second input; and provide, from the comparator neural network using the at least one processor, impact data indicative of the impact for determining the impact.

Item 43. The at least one non-transitory storage media of item 42, wherein the comparator neural network comprises a Siamese neural network, and wherein the instructions that cause the at least one processor to apply the comparator neural network to the first input and the second input cause the at least one processor to apply the Siamese neural network to the first input and the second input.

Item 44. The at least one non-transitory storage media of any one of items 42-43, wherein the comparator neural network comprises a multilayer neural network, and wherein the instructions that cause the at least one processor to apply the comparator neural network to the first input and the second input cause the at least one processor to apply the multilayer neural network to the first input and the second input.

Item 45. The at least one non-transitory storage media of any one of items 41-44, wherein the instructions that cause the at least one processor to determine, using the at least one processor, an impact on the microphone array based on the first microphone input signal and the second microphone input signal cause the at least one processor to:
- determine, using the at least one processor, a first output associated with a first microphone based on the first microphone input signal;
- determine, using the at least one processor, a second output associated with a second microphone based on the second microphone input signal; and
- compare, using the at least one processor, the first output and the second output for determining the impact.

Item 46. The at least one non-transitory storage media of any one of items 41-45, wherein the instructions that cause the at least one processor to determine, using the at least one processor, an impact on the microphone array based on the first microphone input signal and the second microphone input signal cause the at least one processor to select, using the at least one processor, the impact from a set of impacts.

Item 47. The at least one non-transitory storage media of item 46, wherein the set of impacts comprises a first impact being a short-term impact indicative of a collision.

Item 48. The at least one non-transitory storage media of any one of items 46-47, wherein the set of impacts comprises a second impact being a long-term impact indicative of microphone defect.

Item 49. The at least one non-transitory storage media of any one of items 46-48, wherein the set of impacts comprises an impact indicative of malfunction of a microphone.

Item 50. The at least one non-transitory storage media of any one of items 46-49, wherein the set of impacts comprises an impact indicative of a covered or muffled microphone.

Item 51. The at least one non-transitory storage media of any one of items 46-50, wherein the set of impacts comprises an impact indicative of digital audio clipping.

Item 52. The at least one non-transitory storage media of any one of items 46-51, wherein the set of impacts comprises an impact indicative of collision of a first type.

Item 53. The at least one non-transitory storage media of any one of items 46-52, wherein the set of impacts comprises an impact indicative of collision of a second type.

Item 54. The at least one non-transitory storage media of any one of items 46-53, wherein the set of impacts comprises an impact indicative of rain or splashing water.

Item 55. The at least one non-transitory storage media of any one of items 41-54, wherein the instructions that cause the at least one processor to obtain the first microphone input signal cause the at least one processor to: determine, using the at least one processor, a first waveform representation of the first microphone input signal and wherein the instructions that cause the at least one processor to determine, using the at least one processor, an impact on the microphone array cause the at least one processor to determine the impact on the microphone array based on the first waveform representation of the first microphone input signal.

Item 56. The at least one non-transitory storage media of any one of items 41-55, wherein the instructions that cause the at least one processor to obtain the second microphone input signal cause the at least one processor to determine, using the at least one processor, a second waveform representation of the second microphone input signal and wherein the instructions that cause the at least one processor to determine, using the at least one processor, an impact on the microphone array cause the at least one processor to determine the impact on the microphone array based on the second waveform representation of the second microphone input signal.

Item 57. The at least one non-transitory storage media of any one of items 41-56, wherein the instructions that cause the at least one processor to obtain the first microphone input signal cause the at least one processor to determine, using the at least one processor, a first spectrogram of the first microphone input signal and wherein the instructions that cause the at least one processor to determine, using the at least one processor, an impact on the microphone array cause the at least one processor to determine the impact on the microphone array based on the first spectrogram of the first microphone input signal.

Item 58. The at least one non-transitory storage media of any one of items 41-57, wherein the instructions that cause the at least one processor to obtain the second microphone input signal cause the at least one processor to determine, using the at least one processor, a second spectrogram of the second microphone input signal and wherein the instructions that cause the at least one processor to determine, using the at least one processor, an impact on the microphone array cause the at least one processor to determine the impact on the microphone array based on the second spectrogram of the second microphone input signal.

Item 59. The at least one non-transitory storage media of any one of items 41-58, wherein the instructions that cause the at least one processor to obtain, using the microphone array and the at least one processor, a plurality of microphone input signals cause the at least one processor to obtain, using the microphone array and the at least one processor, a third microphone input signal; and wherein the instructions that cause the at least one processor to determine, using the at least one processor, an impact on the microphone array based on the first microphone input signal and the second microphone input signal cause the at least one processor to determine, using the at least one processor, the impact on the microphone array based on the first microphone input signal, the second microphone input signal, and the third microphone input signal.

Item 60. The at least one non-transitory storage media of any one of items 41-59, wherein the instructions further cause the at least one processor to:
- determine whether a monitor criterion is satisfied; and
- in accordance with a determination that the monitor criterion is satisfied, perform to determine an impact on the microphone array based on the first microphone input signal and the second microphone input signal, and provide an instruction associated with the impact.

Item 61. A method comprising:
- obtaining, using a microphone array and at least one processor, a plurality of microphone input signals including a first microphone input signal, a second microphone input signal, and a third microphone signal;
- determining, using the at least one processor, an impact on the microphone array based on the first microphone input signal, the second microphone input signal, and the third microphone input signal, wherein determining, using the at least one processor, an impact on the microphone array based on the first microphone input signal, the second microphone input signal, and the third microphone input signal comprises:
  - providing, using the at least one processor, a first input, a second input, and a third input to a comparator neural network, wherein the first input is based on the first microphone input signal, the second input is based on the second microphone input signal, and the third input is based on the third microphone input signal, applying the comparator neural network to the first input, the second input, and the third input, providing, from the comparator neural network using the at least one processor, impact data indicative of the impact for determining the impact, and selecting, using the at least one processor, the impact from a set of impacts comprising a first impact being a short-term impact indicative of a collision and a second impact being a long-term impact indicative of microphone defect; and providing, via an interface and using the at least one processor, an instruction associated with the impact.

What is claimed is:

1. A method, comprising:
generating, from an audio source within an audio range, using a microphone array, a plurality of microphone input signals including a first microphone input signal and a second microphone input signal;
determining a first output associated with a first microphone in the microphone array, wherein the first microphone input signal corresponds to the first output of the first microphone in the microphone array;
determining a second output associated with a second microphone in the microphone array, wherein the second microphone input signal corresponds to the second output of the second microphone in the microphone array;
determining a likelihood of a set of detrimental effects based at least in part on a comparison of the first output and the second output;
selecting a particular detrimental effect on the microphone array from the set of detrimental effects based at least in part on the likelihood of the particular detrimental effect; and
providing, via an interface, an instruction associated with the particular detrimental effect on the microphone array.

2. The method according to claim 1, wherein:
determining a likelihood of a set of detrimental effects based at least in part on a comparison of the first output and the second output comprises providing the first output and the second output to a comparator neural network; and
receiving, from the comparator neural network, detrimental effects data corresponding to the set of detrimental effects.

3. The method according to claim 2, wherein the comparator neural network comprises a Siamese neural network, wherein the comparator neural network is configured to use the Siamese neural network to determine the likelihood of the set of detrimental effects.

4. The method according to claim 2, wherein the comparator neural network comprises a multilayer neural network, wherein the comparator neural network is configured to use the multilayer neural network to determine the likelihood of the set of detrimental effects.

5. The method according to claim 1, wherein the set of detrimental effects comprises a short-term detrimental effect indicative of a collision.

6. The method according to claim 1, wherein the set of detrimental effects comprises a long-term detrimental effect indicative of microphone defect.

7. The method according to claim 1, wherein the set of detrimental effects comprises one or more of a detrimental effect indicative of malfunction of a microphone, a detrimental effect indicative of a covered or muffled microphone, and a detrimental effect indicative of digital audio clipping.

8. The method according to claim 1, wherein the set of detrimental effects comprises a detrimental effect indicative of a collision of a first type.

9. The method according to claim 8, wherein the set of detrimental effects comprises a detrimental effect indicative of a collision of a second type.

10. The method according to claim 1, wherein the set of detrimental effects comprises a detrimental effect indicative of rain or splashing water.

11. The method according to claim 1, wherein generating the first microphone input signal comprises determining a first waveform representation of the first microphone input signal and wherein determining a likelihood of a set of detrimental effects is based on the first waveform representation of the first microphone input signal.

12. The method according to claim 1, wherein generating the second microphone input signal comprises determining a second waveform representation of the second microphone input signal and wherein determining a likelihood of a set of detrimental effects is based on the second waveform representation of the second microphone input signal.

13. The method according to claim 1, wherein generating the first microphone input signal comprises determining a first spectrogram of the first microphone input signal and wherein determining a likelihood of a set of detrimental effects is based on the first spectrogram of the first microphone input signal.

14. The method according to claim 1, wherein generating the second microphone input signal comprises determining a second spectrogram of the second microphone input signal and wherein determining a likelihood of a set of detrimental effects is based on the second spectrogram of the second microphone input signal.

15. The method according to claim 1, wherein:
the plurality of microphone input signals comprises a third microphone input signal, the method further comprising:
determining a third output associated with a third microphone in the microphone array, wherein the third microphone input signal corresponds to the third output of the third microphone in the microphone array,
wherein determining a likelihood of a set of detrimental effects comprises determining a likelihood of a set of detrimental effects based at least in part on the first output, the second output, and the third output.

16. The method according to claim 1, further comprising:
determining whether a monitor criterion is satisfied; and
in accordance with determining that the monitor criterion is satisfied:
selecting the particular detrimental effect on the microphone array from the set of detrimental effects based at least in part on the likelihood of the particular detrimental effect, and
providing the instruction associated with the particular detrimental effect.

17. The method of claim 1, wherein: the plurality of microphone input signals further includes a third microphone input signal, the method further comprising:
determining a third output associated with a third microphone in the microphone array, wherein the third microphone input signal corresponds to the third output of the third microphone in the microphone array, and
wherein determining a likelihood of a set of detrimental effects comprises determining a likelihood of a set of detrimental effects based at least in part on a comparison of the first output, the second output, and the third output, wherein determining a likelihood of a set of detrimental effects based at least in part on a comparison of the first output, the second output, and the third output comprises:
- providing the first output, the second output, and the third output to a comparator neural network; and
- receiving, from the comparator neural network, detrimental effects data indicative of the set of detrimental effects,
- wherein the set of detrimental effects comprises a short-term detrimental effect indicative of a collision and a long-term detrimental effect indicative of microphone defect.

18. A system comprising:
a microphone array comprising a plurality of microphones;
at least one processor;
at least one interface; and
at least one non-transitory computer readable medium storing instructions that, when executed by the at least one processor, cause the at least one processor to:
- generate, from an audio source within an audio range, using the microphone array, a plurality of microphone input signals including a first microphone input signal and a second microphone input signal;
- determine a first output associated with a first microphone in the microphone array, wherein the first microphone input signal corresponds to the first output of the first microphone in the microphone array;
- determine a second output associated with a second microphone in the microphone array, wherein the second microphone input signal corresponds to the second output of the second microphone in the microphone array;
- determine a likelihood of a set of detrimental effects based at least in part on a comparison of the first output and the second output;
- select a particular detrimental effect on the microphone array from the set of detrimental effects based at least in part on the likelihood of the particular detrimental effect; and
- provide, via the at least one interface, an instruction associated with the particular detrimental effect on the microphone array.

19. A computer-readable medium comprising computer-executable instructions that, when executed by at least one processor, cause the at least one processor to perform operations including:
- generating, from a audio source within an audio range, using a microphone array, a plurality of microphone input signals including a first microphone input signal and a second microphone input signal;
- determining a first output associated with a first microphone in the microphone array, wherein the first microphone input signal corresponds to the first output of the first microphone in the microphone array;
- determining a second output associated with a second microphone in the microphone array, wherein the second microphone input signal corresponds to the second output of the second microphone in the microphone array;
- determining a likelihood of a set of detrimental effects based at least in part on a comparison of the first output and the second output;
- selecting a particular detrimental effect on the microphone array from the set of detrimental effects based at least in part on the likelihood of the particular detrimental effect; and
- providing, via an interface, an instruction associated with the particular detrimental effect on the microphone array.

* * * * *